US012109530B2

(12) United States Patent
Shin et al.

(10) Patent No.: US 12,109,530 B2
(45) Date of Patent: Oct. 8, 2024

(54) WASTE GAS SEPARATION AND TREATMENT APPARATUS AND CONTROL METHOD THEREOF

(71) Applicants: DASAN CO., LTD, Gyeonggi-do (KR); Bong Geum Shin, Daegu (KR)

(72) Inventors: Bong Geum Shin, Daegu (KR); Seong Uk Cho, Hwaseong-Si (KR)

(73) Assignees: DASAN CO., LTD., Hwaseong-si (KR); Bong Geum Shin, Daegu (KR)

( * ) Notice: Subject to any disclaimer, the term of this patent is extended or adjusted under 35 U.S.C. 154(b) by 293 days.

(21) Appl. No.: 17/604,173

(22) PCT Filed: Aug. 25, 2020

(86) PCT No.: PCT/KR2020/011307
§ 371 (c)(1),
(2) Date: Oct. 15, 2021

(87) PCT Pub. No.: WO2021/045427
PCT Pub. Date: Mar. 11, 2021

(65) Prior Publication Data
US 2022/0203299 A1  Jun. 30, 2022

(30) Foreign Application Priority Data
Sep. 4, 2019 (KR) .................... 10-2019-0109342
Feb. 5, 2020 (KR) .................... 10-2020-0013583

(51) Int. Cl.
*B01D 53/02* (2006.01)
*B01D 47/06* (2006.01)
(Continued)

(52) U.S. Cl.
CPC .......... *B01D 53/78* (2013.01); *B01D 47/063* (2013.01); *B01D 53/005* (2013.01);
(Continued)

(58) Field of Classification Search
CPC .......... B01D 2247/10; B01D 2252/103; B01D 2258/0216; B01D 47/063; B01D 53/005;
(Continued)

(56) References Cited

U.S. PATENT DOCUMENTS 5,649,985 A * 7/1997 Imamura ................ B01D 53/58
96/275
5,984,318 A * 11/1999 Kojima .................. F16J 15/061
277/637

(Continued)

FOREIGN PATENT DOCUMENTS

JP          3196125 U        2/2015
KR      10-0237836 B1        1/2000
(Continued)

OTHER PUBLICATIONS

Translation of KR 10-1777283; Dasan (Year: 2017).*
Translation of KR 10-0284324; Kim (Year: 2001).*

*Primary Examiner* — Christopher P Jones
(74) *Attorney, Agent, or Firm* — PARK LAW FIRM (57) ABSTRACT

The present invention can separate waste gases according to whether they are corrosive or non-corrosive to perform pyrolysis treatment thereof individually, wherein powder fixed to a heating module and a chamber is removed to increase operation efficiency and equipment durability, and the collected powder can be externally discharged even during operation.

7 Claims, 8 Drawing Sheets

(51) Int. Cl.
  *B01D 53/00* (2006.01)
  *B01D 53/14* (2006.01)
  *B01D 53/18* (2006.01)
  *B01D 53/78* (2006.01)
  *B08B 9/087* (2006.01)

(52) U.S. Cl.
  CPC ......... *B01D 53/1431* (2013.01); *B01D 53/18* (2013.01); *B08B 9/087* (2013.01); *B01D 2252/103* (2013.01); *B01D 2258/0216* (2013.01)

(58) Field of Classification Search
  CPC .. B01D 53/1431; B01D 53/18; B01D 53/346; B01D 53/78; B08B 9/087
  See application file for complete search history.

(56) References Cited

U.S. PATENT DOCUMENTS

| | | | |
|---|---|---|---|
| 6,638,343 B1* | 10/2003 | Kawamura | B01D 53/78 95/218 |
| 10,617,997 B1* | 4/2020 | Maeda | C23C 16/4405 |
| 2015/0044100 A1* | 2/2015 | Yukumoto | B01D 53/346 422/119 |
| 2015/0367284 A1* | 12/2015 | Shinohara | B01D 53/90 422/171 |
| 2017/0320012 A1* | 11/2017 | Kaneshiro | B01D 53/68 |
| 2021/0146298 A1* | 5/2021 | Lee | B01D 21/01 |

FOREIGN PATENT DOCUMENTS

| | | |
|---|---|---|
| KR | 10-0284324 B1 | 3/2001 |
| KR | 10-0507598 B1 | 8/2005 |
| KR | 10-1777283 B1 | 9/2017 |
| KR | 10-2135068 B1 | 7/2020 |

* cited by examiner

WASTE GAS SEPARATION AND TREATMENT APPARATUS AND CONTROL METHOD THEREOF

BACKGROUND OF THE DISCLOSURE

Field of the Disclosure

The present disclosure relates to a waste gas separation and treatment apparatus and, more particularly, to a waste gas separation and treatment apparatus that operates in conjunction with main equipment by receiving signals from it, and that can separate waste gases according to whether they are corrosive or non-corrosive to perform pyrolysis treatment thereof individually, wherein powder fixed to a heating module and a chamber is removed to increase operation efficiency and equipment durability, and the collected powder can be externally discharged even during operation.

Related Art

In general, corrosive and non-corrosive waste gases emitted from LCD and semiconductor manufacturing processes or chemical processes—for example, perfluoro compound (PFC) gases—have to be rendered harmless and then released into the atmosphere.

Dry and wet gas cleaning for the pyrolysis of waste gases needs to be done to render the waste gases harmless, and a prior art technology related to the above treatment to render waste gases harmless is disclosed in Korean Patent Registration No. 10-0937697 titled "Waste gas treatment apparatus").

The waste gas treatment apparatus according to the prior art includes a chamber 10 where waste gases are treated, a waste gas inlet 12 through which waste gases enter, a thermal treatment part 20 for thermally decomposing waste gases passing through the inside of the chamber 10, and a cooling part for cooling the waste gases which are thermally decomposed as they pass through the chamber 10. It renders waste gases harmless by exposing the waste gases directly to the inside of the chamber 10 and thermally decomposing them with high heat generated by the thermal treatment part 20.

However, the waste gas treatment apparatus according to the prior art is problematic in that powder produced in the pyrolysis of waste gases is fixed to the inside of the chamber, causing a decrease in operation efficiency and a significant drop in durability.

Another problem is that it is difficult to manage waste including powder due to the absence of a structure for collecting powder.

SUMMARY

The present disclosure has been made in an effort to solve the above-mentioned problems and to provide a waste gas separation and treatment apparatus that can separate waste gases according to whether they are corrosive or non-corrosive to perform pyrolysis treatment thereof individually.

The present disclosure also provides a waste gas separation and treatment apparatus that can increase operation efficiency and ensure equipment durability by removing powder fixed to outside surfaces of heating modules and an inside surface of a chamber by means of a scraper unit.

The present disclosure also provides a waste gas separation and treatment apparatus that allows for continuous operation and therefore improves utilization, because it has first and second waste storage tanks, and powder collected in the second waste storage tank can be externally discharged even during equipment operation.

The present disclosure also provides a waste gas separation and treatment apparatus that facilitates waste gas treatment by preventing fixing or generation of powder by feeding a heated processing gas into a second flow pipe, and that improves treatment efficiency and lengthens equipment life since it does not use additional electrical energy.

An exemplary embodiment of the present disclosure provides a waste gas separation and treatment apparatus including: a waste gas separation part having an inlet opening through which a waste gas enters from a preliminary process, a direction-change valve for changing the direction of flow depending on whether the waste gas entering through the inlet opening is corrosive or non-corrosive, and a first flow pipe and a second flow pipe through which the waste gas flows by means of the direction-change valve; a heating tank part including a plurality of heating modules for thermally decomposing the waste gas passed through the first and second flow pipes and a chamber housing the first and second flow pipes; a scraper unit installed on the heating tank part, for scraping powder fixed to an inside surface of the chamber; and a wet cleaning part that communicates with the heating tank part and has a plurality of spray nozzles inside through which a cleaning solution for the wet cleaning of the waste gas passed through the heating tank part is sprayed.

Furthermore, the scraper unit may include: a ring-shaped base rail; a motor part on one side of the base rail; a first gear part connected to a shaft of the motor part; a ring-shaped second gear part rotatably mounted inside the base rail, that meshes with the first gear part; and a first powder removal part on an inside surface of the second gear part, that makes contact with the inside surface of the chamber.

Furthermore, a second powder removal bar may be provided on the inside surface of the second gear part and makes contact with some of the outside surfaces of the heating modules to remove the powder fixed to the outside surfaces of the heating modules.

Furthermore, a first waste storage tank may be provided under the wet cleaning part and connected to the wet cleaning part to collect the powder and the cleaning solution therein.

Furthermore, a second waste storage tank may be provided under the first waste storage tank and connected to the first waste storage tank to collect the power transferred from the first waste storage tank and transfer the cleaning solution back to the first waste storage tank.

Furthermore, a heat transfer pipe may be provided between the second flow pipe and each of the heating modules and allows a processing gas fed from the preliminary process to be heated through the heating modules and move into the second flow pipe.

DESCRIPTION OF EXEMPLARY EMBODIMENTS

Hereinafter, a waste gas separation and treatment apparatus 1 according to an exemplary embodiment of the present disclosure will be described in detail with reference to the accompanying drawings. First, in the drawings, it should be noted that the same components or parts are designated by the same reference numerals if possible. In describing the present disclosure, the detailed description of related known functions or constructions will be omitted so as not to obscure the gist of the present disclosure.

Figure 1:
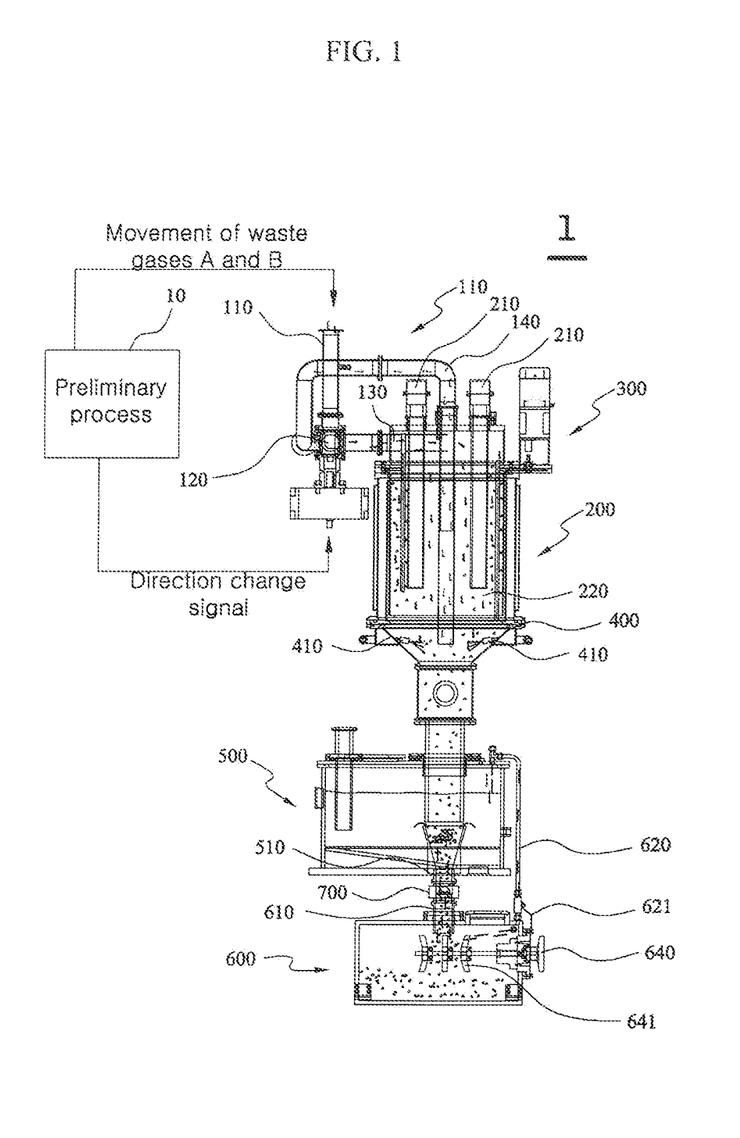
FIG. 1 is an overall front view of a waste gas separation and treatment apparatus according to an exemplary embodiment of the present disclosure.

Referring to FIG. 1, a waste gas separation and treatment apparatus 1 according to an exemplary embodiment of the present disclosure roughly includes a waste gas separation part 100, a heating tank part 200, a scraper unit 300, a wet cleaning part 400, a first waste storage tank 500, and a second waste storage tank 600.

Figure 2:
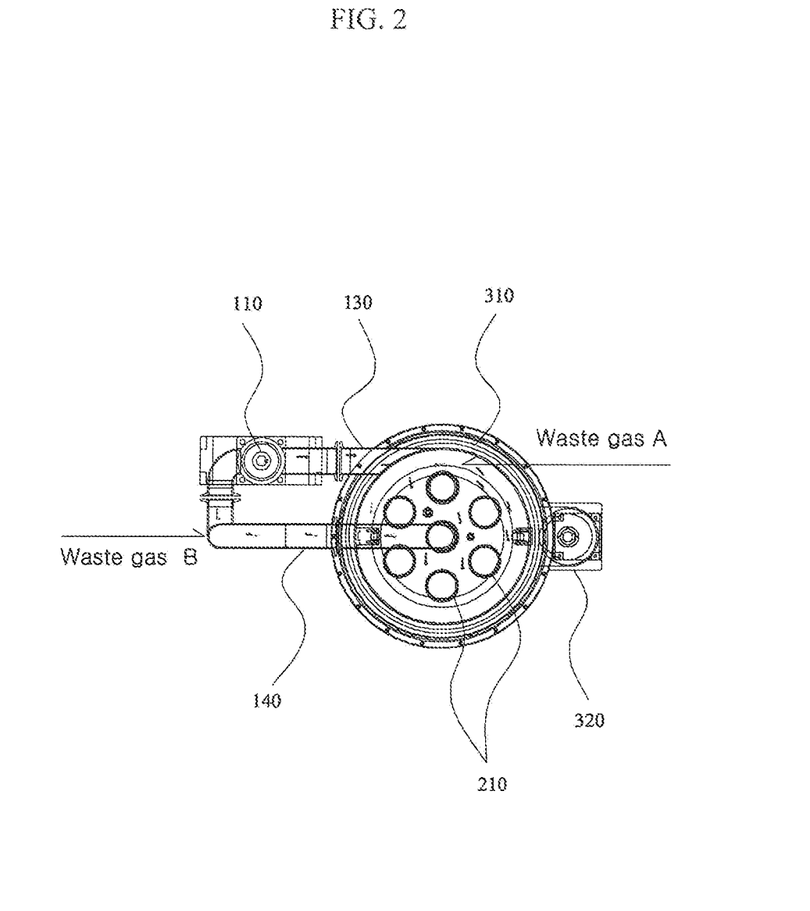
FIG. 2 is a plan view of a waste gas separation and treatment apparatus according to an exemplary embodiment of the present disclosure.

First of all, the waste gas separation part 100 will be described. As depicted in FIG. 1 or FIG. 2, the waste gas separation part 100 is a component that separates a variety of waste gases used and emitted in a preliminary process according to type, for example, as in LCD manufacture, semiconductor manufacture, or chemical manufacture, and transfer them through different tubes. It has an inlet opening 110 through which a waste gas emitted from the preliminary process 100 enters.

Moreover, a direction-change valve 120 is provided to change the direction of flow depending on whether the waste gas entering through the inlet opening 110 is corrosive or non-corrosive, and a first flow pipe 130 and a second flow pipe 140 through which the waste gas flows by means of the direction-change valve 120 are located inside the heating tank part 200 to be described later.

Meanwhile, an actuating module (not shown) may be further included which receives a direction change signal from the preliminary process 10 and actuates the direction-change valve 120 in conjunction with whether the waste gas from the preliminary process is corrosive or non-corrosive.

Meanwhile, the waste gas separation part 100 operates in such a way that the waste gas emitted from the preliminary process 10 enters through the inlet opening 110 first and then receives a direction change signal from the preliminary process 10, for example, a waste gas separation signal which works in conjunction with whether the waste gas is corrosive or non-corrosive, before it is fed into the chamber 220 of the heating tank part 200. Afterwards, the actuating module (not shown) actuates the direction-change valve 120 to exclusively select the first flow pipe 130 or the second flow pipe 140.

Next, the heating tank part 200 will be described. As depicted in FIG. 1, the heating tank part 200 includes a plurality of heating modules 210 for thermally decomposing the waste gas passed through the first flow pipe 130 and the waste gas passed through the second flow pipe 140, and a chamber 122 housing the first flow pipe 130 and the second flow pipe 140.

In this case, the heating modules 210 may be comprised of electric heaters (not shown) or plasma arc torches (not shown).

Here, as depicted in FIG. 2, it is desirable that the heating modules 210 are spaced out at equal intervals and arranged in a circle so as to uniformly distribute heat throughout the inside of the chamber 220.

Although, in the present disclosure, it is illustrated that six heating modules 210 are arranged in a circle according to an exemplary embodiment, the number and arrangement of heating modules 210 are not specifically limited as long as they provide maximum pyrolysis efficiency for the size of the chamber 220 and the preliminary process.

Figure 6:
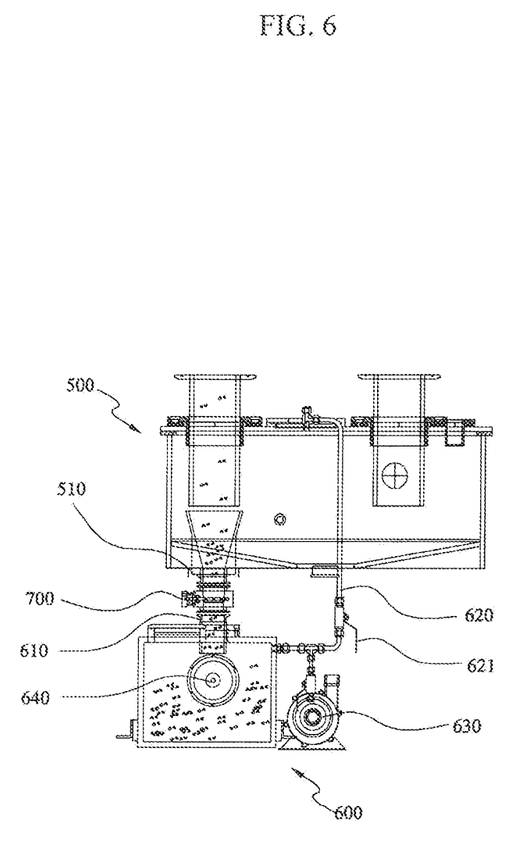
FIG. 6 is a side view of first and second waste storage tanks, in the construction of a waste gas separation and treatment apparatus according to an exemplary embodiment of the present disclosure.

Meanwhile, as depicted in FIG. 6, a heat transfer pipe 230 is provided between the second flow pipe 140 and each of the heating modules 210, and the heat transfer pipe 230 allows a processing gas (e.g., nitrogen) fed from the preliminary process 10 to be heated through the heating modules 210 and move into the second flow pipe 130.

It is desirable that the heat transfer pipe 230 has a thermometer 240 for checking the heat temperature of the processing gas moving to the heat transfer pipe 230 and a check valve 250 for regulating the amount of flow of the heated processing gas.

With this construction, if it is expected that a corrosion or leak may occur in the second flow pipe 130, a processing gas heated to 200° C. or above by the heating modules 210 is fed into the second flow pipe 130 through the heat transfer pipe 230, so that both the inside and outside temperatures of the second flow pipe 140 rise and therefore prevent powder from being generated or fixed to the inside of the second flow pipe 140.

Next, the scraper unit 300 will be described. As depicted in FIG. 2, FIG. 3, FIG. 4, or FIG. 5, the scraper unit 300 is a component that is installed on the heating tank part 200 and scrapes powder fixed to the heating modules 210 or the chamber 220 and causes it to fall off. It includes a base rail 310, a motor part 320, a first gear part 330, a second gear part 340, a first powder removal bar 350, and a second powder removal bar 360.

Figure 3:
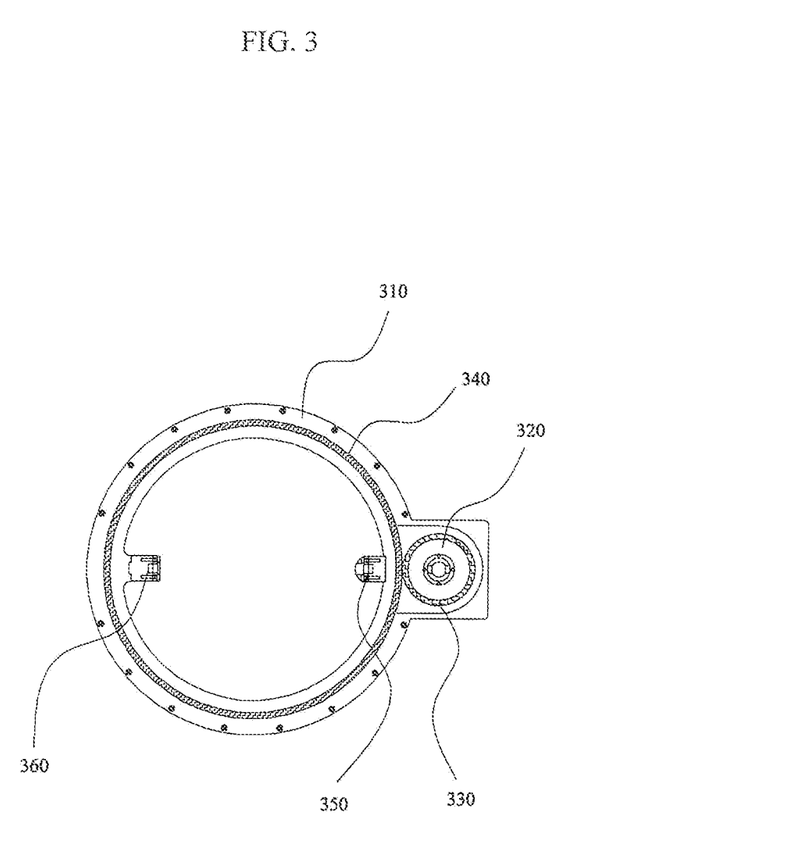
FIG. 3 is a plan view of a scraper unit, in the construction of a waste gas separation and treatment apparatus according to an exemplary embodiment of the present disclosure.
Figure 4:
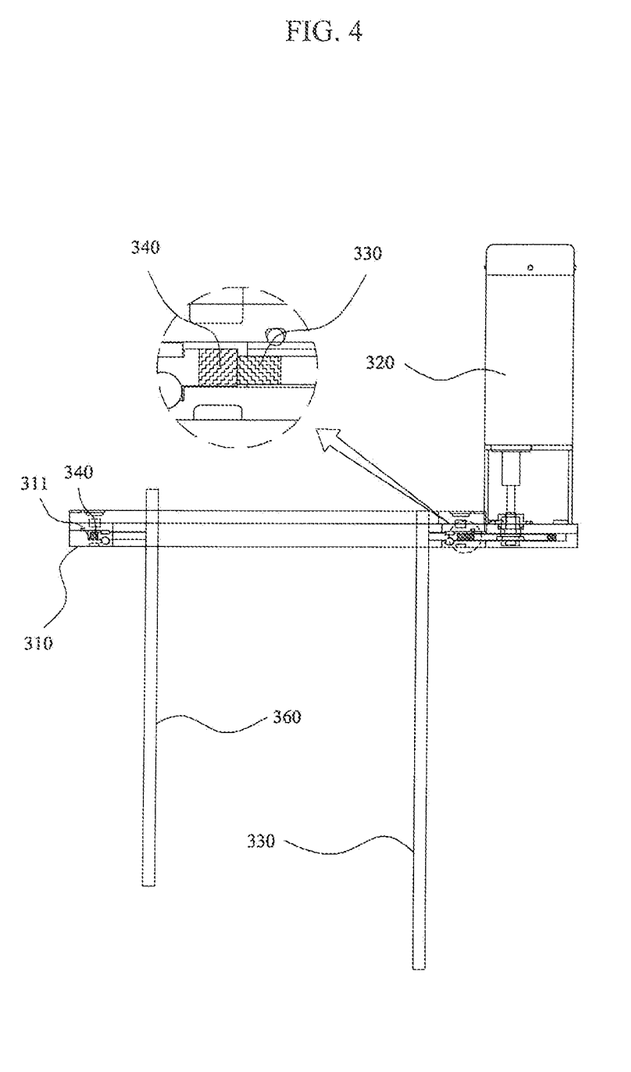
FIGS. 4 and 5 are front views of a scraper unit, in the construction of a waste gas separation and treatment apparatus according to an exemplary embodiment of the present disclosure.
Figure 5:
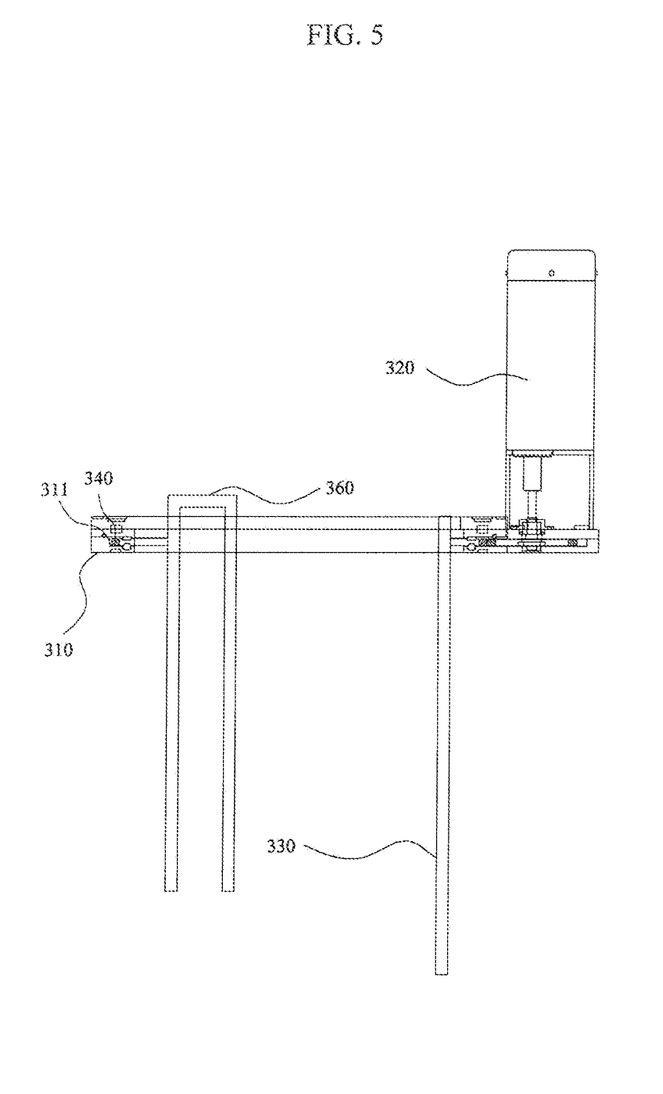

The base rail 310 is a ring-shaped component that is installed on an upper end of the heating tank part 200, and a mounting groove 311 is formed inside the base rail 320 so that the second gear part 340 rotates while mounted.

The motor part 320 is a kind of driver provided on one side of the base rail 310.

The first gear part 330 is a component that is connected to a shaft of the motor part 320 and rotates depending on whether the motor part 320 is driven or not, and serves to transfer the torque of the motor part 320 by meshing with the second gear part 340.

The second gear part 340 is formed as a ring shape, with a gear on the outside, and is located inside the base rail 310 and rotates by the first gear part 330 which rotates as the motor part 320 is driven, thereby enabling rotation of the first and second powder removal bars 350 and 360.

The first powder removal bar 350 is a component that runs lengthwise vertically on the inside of the second gear part 340 and makes contact with an inside surface of the chamber 220. It rotates in tandem with the rotation of the second gear part 340 so that its torque allows the powder fixed to the inside surface of the chamber 220 to fall off by being scraped.

Like the first powder removable bar 350, the second powder removal bar 360 is a component that runs lengthwise vertically on the inside of the second gear part 340, and makes contact with some of the outside surfaces of the heating modules 210. It rotates in tandem with the rotation of the second gear part 340 so that its torque allows the powder fixed to the outside surfaces of the heating modules 210 to fall off by being scraped.

The second powder removal bar 360 may be symmetrical on both sides of each of heating modules 210, in order to make contact with outside surfaces of the heating modules 210.

Next, the wet cleaning part 400 will be described. As depicted in FIG. 1, the wet cleaning part 400 includes a lower frame (not shown) communicating with the bottom of the heating tank part 200, that is placed under the heating tank part 200 and has a tapered shape with an open top and bottom, and a plurality of spray nozzles 410 placed inside the lower frame (not shown), through which a cleaning solution (e.g., water, purified water, etc.) for the wet cleaning of the waste gas passed through the heating tank part 200 is sprayed.

The spray nozzles 410 spray the cleaning solution into the lower frame (not shown) to facilitate the falling of fine powder and allow residual waste gases passed through the heating tank part 200 to be neutralized with water.

Next, the first waste storage tank 500 will be described. As depicted in FIG. 1 or FIG. 6, the first waste storage tank 500 is a component that is connected to the underside of the wet cleaning part 400, in which the powder and cleaning solution falling from the wet cleaning part 400 are collected. An outlet duct 510 may be provided in a lower portion of the first waste storage tank 500 to communicate with the second waste storage tank 600 to be described later.

Next, the second waste storage tank 600 will be described. As depicted in FIGS. 1 to 6, the second waste storage tank 600 is a component connected to the underside of the first waste storage tank 500, in which the powder transferred from the first waste storage tank 500 is collected, and from which the cleaning solution is transferred back to the first waste storage tank 500. The second waste storage tank 600 includes a connecting pipe 610, a circulation pipe 620, and a powder dispersion handling part 640.

The connecting pipe 610 is bolted to the outlet duct 510 and allows the transfer of the powder and cleaning solution in the first waste storage tank 500 to the second waste storage tank 600.

A butterfly valve 700 may be installed between the outlet duct 510 and the connecting pipe 610, which allows for continuous operation and therefore efficient operation because the powder collected in the second waste storage tank 600 may be externally discharged even during operation of the apparatus after the butterfly valve 700 is closed.

The circulation pipe 620 is a separate pipe installed to make the cleaning solution circulate between the first waste storage tank 500 and the second waste storage tank 600. If necessary, the circulation pipe 620 may allow the cleaning solution to be circulated by a circulation motor 630 and restrict the movement of the cleaning solution by means of an on-off valve 621 installed on the circulation pipe 620.

The powder dispersion handling part 640 may be rotatably installed on one side of the second waste storage tank 600. The rotation of the powder dispersion handling part 640 causes rotation of a dispersion blade 651, which is connected to the other side of the powder dispersion handling part 640 and positioned within the second waste storage tank 600, whereby the powder piled up in the second waste storage tank 600 is pushed and flattened when collected.

Figure 8:
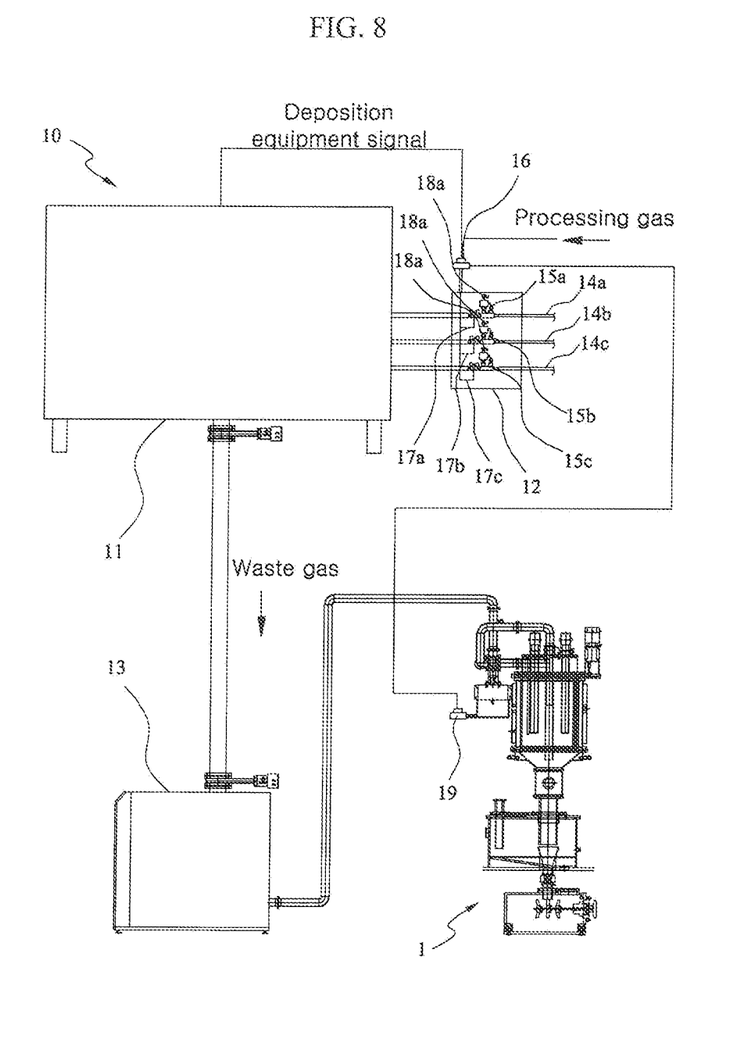
FIG. 8 is a front view of the control flow of a preliminary process, in the construction of a waste gas separation and treatment apparatus according to another exemplary embodiment of the present disclosure.

Meanwhile, the preliminary process 10 includes deposition equipment 11, an MFC 12, and a vacuum pump 13, the MFC 12 including cleaning gas feed pipes 14a, 14b, and 14c into which different cleaning gases are supplied so as to be fed to the deposition equipment 11, solenoid valves 15a, 15b, and 15c for closing or opening the respective cleaning gas feed pipes 14a, 14b, and 14c, and pressure sensors 18a, 18b, and 18c connected to the respective solenoid valves 15a, 15b, and 15c. It should be noted that this construction employs a technology that is generally applied in the art.

Meanwhile, a control valve 16 is constructed in such a way as to receive a control signal from the deposition equipment 11 and regulate whether to feed a cleaning gas or not, by which connecting tubes 17a, 17b, and 17c are connected to the respective solenoid valves 15a, 15b, and 15c.

Based on this construction, a control method for a waste gas separation and treatment apparatus according to another exemplary embodiment of the present disclosure will be described below.

Figure 7:
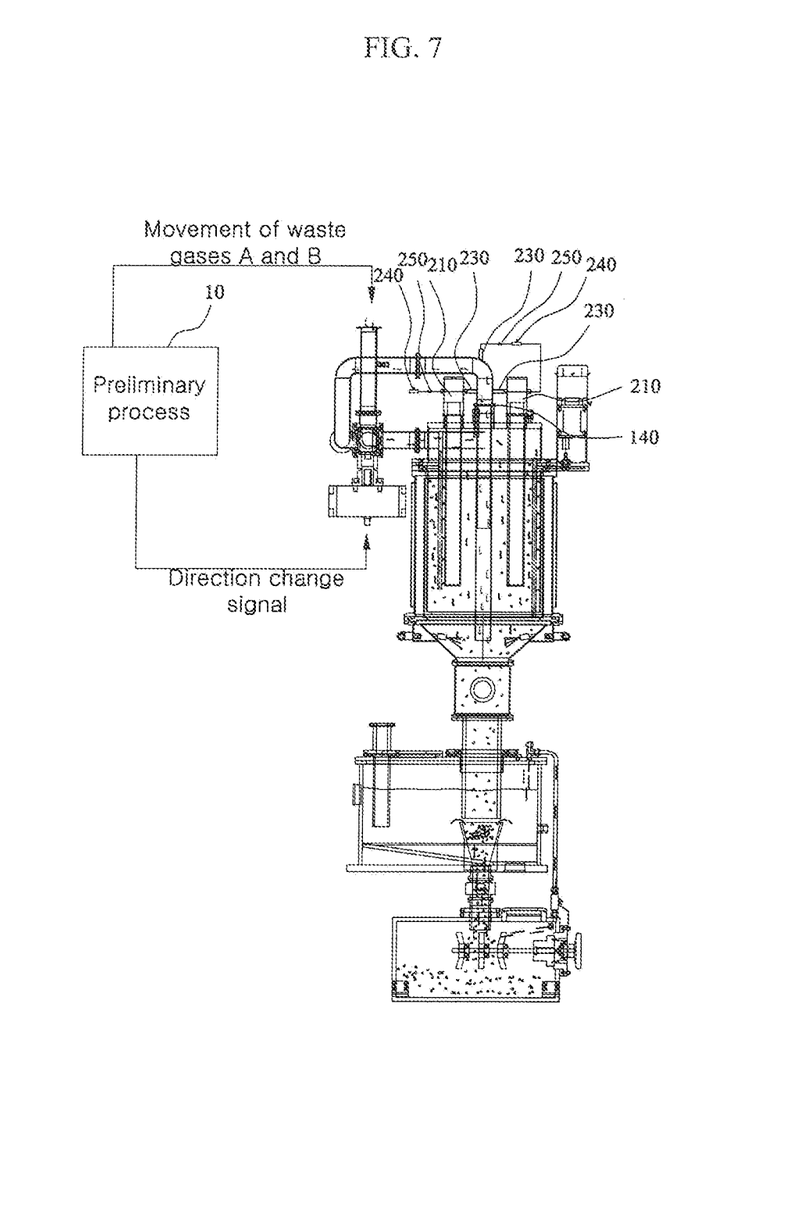
FIG. 7 is a front view of a heat transfer pipe being connected to a second flow tube, in the construction of a waste gas separation and treatment apparatus according to an exemplary embodiment of the present disclosure.

Referring to FIG. 7, first of all, the control valve 16 senses information on a selected cleaning gas upon receiving a control signal from the deposition equipment 11. Thereafter, the control valve 16 is opened through an external processing gas. Next, the solenoid valve 15a is opened through the connecting tube 17a connected to the selected cleaning gas by using the pressure of the processing gas. Afterwards, the cleaning gas is supplied to the deposition equipment 11 through the cleaning gas feed pipe 14a connected to the solenoid valve 15a. Next, the information on the cleaning gas supplied to the deposition equipment 11 is sensed and provided to the worker.

With this control method, it is possible to sense and identify which cleaning gas is selected from among a variety of cleaning gases fed into the deposition equipment 11. Therefore, waste gases can be separated and distinguished after the cleaning process, which is very useful in waste gas treatment.

The best embodiments have been disclosed in the drawings and specification. Specific terms have been used herein, but the terms are used to only describe the present disclosure, but are not used to limit the meaning of the terms or the scope of rights of the present disclosure written in the claim. Accordingly, those skilled in the art will understand that various modifications and other equivalent embodiments are possible from the embodiments. Accordingly, the true technical range of protection of the present disclosure should be determined by the technical spirit of the following claims.

As seen from above, the present disclosure has an advantage in that it can separate waste gases according to whether they are corrosive or non-corrosive to perform pyrolysis treatment thereof individually.

Another advantage of the present disclosure is that it can increase operation efficiency and ensure equipment durability by removing powder fixed to outside surfaces of heating modules and an inside surface of a chamber by means of a scraper unit.

Another advantage of the present disclosure is that it allows for continuous operation and therefore improves utilization, because it has first and second waste storage tanks and powder collected in the second waste storage tank can be externally discharged even during equipment operation.

Further advantages of the present disclosure are that it facilitates waste gas treatment by preventing fixing or generation of powder by feeding a heated processing gas into a second flow pipe, and that it improves treatment efficiency and lengthens equipment life since it does not use additional electrical energy.

What is claimed is:

1. A waste gas separation and treatment apparatus comprising:
    a waste gas separation part having an inlet opening through which a waste gas enters from a preliminary process, a direction-change valve for changing the direction of flow depending on whether the waste gas entering through the inlet opening is corrosive or non-corrosive, and a first flow pipe and a second flow pipe through which the waste gas flows by means of the direction-change valve;
    a heating tank part including a plurality of heating modules for thermally decomposing the waste gas passed through the first and second flow pipes and a chamber housing the first and second flow pipes;
    a scraper unit installed on the heating tank part, for scraping powder fixed to an inside surface of the chamber;
    a wet cleaning part that communicates with the heating tank part and has a plurality of spray nozzles inside through which a cleaning solution for the wet cleaning of the waste gas passed through the heating tank part is sprayed; and
    wherein a heat transfer pipe is provided between the second flow pipe and each of the heating modules and allows a processing gas fed from the preliminary process to be heated through the heating modules and move into the second flow pipe.

2. A waste gas separation and treatment apparatus comprising:
    a waste gas separation part having an inlet opening through which a waste gas enters from a preliminary process, a direction-change valve for changing the direction of flow depending on whether the waste gas entering through the inlet opening is corrosive or non-corrosive, and a first flow pipe and a second flow pipe through which the waste gas flows by means of the direction-change valve;
    a heating tank part including a plurality of heating modules for thermally decomposing the waste gas passed through the first and second flow pipes and a chamber housing the first and second flow pipes;
    a scraper unit installed on the heating tank part, for scraping powder fixed to an inside surface of the chamber;
    a wet cleaning part that communicates with the heating tank part and has a plurality of spray nozzles inside through which a cleaning solution for the wet cleaning of the waste gas passed through the heating tank part is sprayed;
    wherein the preliminary process comprises a deposition equipment, a waste gas inlet and a vacuum pump, the waste gas inlet comprising:
        cleaning gas feed pipes into which different cleaning gases are supplied so as to be fed to the deposition equipment;
        solenoid valves for closing or opening the respective cleaning gas feed pipes; and
        pressure sensors connected to the respective solenoid valves, and
    a control valve, wherein the control valve is constructed in such a way as to receive a control signal from the deposition equipment and regulate whether to feed a cleaning gas or not, by which connecting tubes are connected to the respective solenoid valves.

3. A control method for a waste gas separation and treatment apparatus, which senses and identifies which cleaning gas is selectively fed to the deposition equipment of the waste gas separation and treatment apparatus of claim 2, the method comprising:
    sensing, by the control valve, information on a selected cleaning gas upon receiving a control signal from the deposition equipment;
    opening the control valve by a processing gas fed from the preliminary process;
    opening a first of the solenoid by using the pressure of the processing gas;
    supplying the cleaning gas to the deposition equipment through a cleaning gas feed pipe connected to the first of the solenoid valves; and
    sensing the information on the cleaning gas supplied to the deposition equipment and providing the same to a worker.

4. The waste gas separation and treatment apparatus of claim 1, wherein the scraper unit comprises:
    a ring-shaped base rail;
    a motor part on one side of the base rail;
    a first gear part connected to a shaft of the motor part;
    a ring-shaped second gear part rotatably mounted inside the base rail, that meshes with the first gear part; and
    a first powder removal part on an inside surface of the second gear part, that makes contact with the inside surface of the chamber.

5. The waste gas separation and treatment apparatus of claim 1, wherein a second waste storage tank is provided under a first waste storage tank and connected to the first waste storage tank to collect the powder transferred from the first waste storage tank and transfer the cleaning solution back to the first waste storage tank.

6. The waste gas separation and treatment apparatus of claim 2, wherein the scraper unit comprises:
    a ring-shaped base rail;
    a motor part on one side of the base rail;
    a first gear part connected to a shaft of the motor part;
    a ring-shaped second gear part rotatably mounted inside the base rail, that meshes with the first gear part; and
    a first powder removal part on an inside surface of the second gear part, that makes contact with the inside surface of the chamber.

7. The waste gas separation and treatment apparatus of claim 2, wherein a second waste storage tank is provided under a first waste storage tank and connected to the first waste storage tank to collect the powder transferred from the first waste storage tank and transfer the cleaning solution back to the first waste storage tank.

* * * * *